United States Patent [19]
Kimura

[11] Patent Number: 5,289,380
[45] Date of Patent: Feb. 22, 1994

[54] SYSTEM AND METHOD FOR CONTROLLING DAMPING FORCE CHARACTERISTIC OF SHOCK ABSORBER APPLICABLE TO AUTOMOTIVE SUSPENSION

[75] Inventor: Makoto Kimura, Kanagawa, Japan

[73] Assignee: Atsugi Unisia Corporation, Japan

[21] Appl. No.: 791,516

[22] Filed: Nov. 14, 1991

[30] Foreign Application Priority Data

Nov. 16, 1990 [JP] Japan .................. 2-120456[U]

[51] Int. Cl.⁵ .................................. B60G 17/00
[52] U.S. Cl. .................. 364/424.05; 280/707; 280/840
[58] Field of Search .......... 364/424.05; 280/707, 280/840

[56] References Cited

U.S. PATENT DOCUMENTS

| | | | |
|---|---|---|---|
| 3,807,678 | 4/1974 | Karnopp et al. | 248/358 R |
| 4,961,483 | 10/1990 | Yamaoka et al. | 280/707 |
| 5,033,770 | 7/1991 | Kamimura et al. | 280/707 |
| 5,103,396 | 4/1992 | Hiwatashi et al. | 280/707 |
| 5,144,559 | 9/1992 | Kamimura et al. | 280/840 |

FOREIGN PATENT DOCUMENTS 63-6238  1/1988  Japan .
3-84237  4/1991  Japan .

*Primary Examiner*—Gary Chin
*Attorney, Agent, or Firm*—Ronald P. Kananen

[57] ABSTRACT

A system and method for controlling a damping force for a vehicular damper is disclosed in which the damper is provided with a damping factor adjusting mechanism which is installed for adjusting the damping force characteristic at a plurality of stages. When both directions of a vertical velocity of an sprung mass (vehicle body) and of a relative velocity between the unsprung mass and sprung mass coincide with each other, a controller outputs a control signal to the damping factor adjusting mechanism so that the damping force characteristic of the damper is changed to a higher damping force side, provided that the relative velocity exceeds a predetermined dead zone. In addition, when both directions do not coincide with each other, the controller outputs the control signal so that the damping force characteristic is changed to a lower damping force side. The controller determines a stroke direction of the damper on the basis of the relative velocity and shifts the predetermined dead zone toward a direction opposite to the determined stroke direction. Since the dead zone is shifted, the timing with which the relative velocity exceeds the dead zone is speeded up so that the change timing of the damping factor from the lower damping force side to the higher damping side occurs earlier.

14 Claims, 4 Drawing Sheets

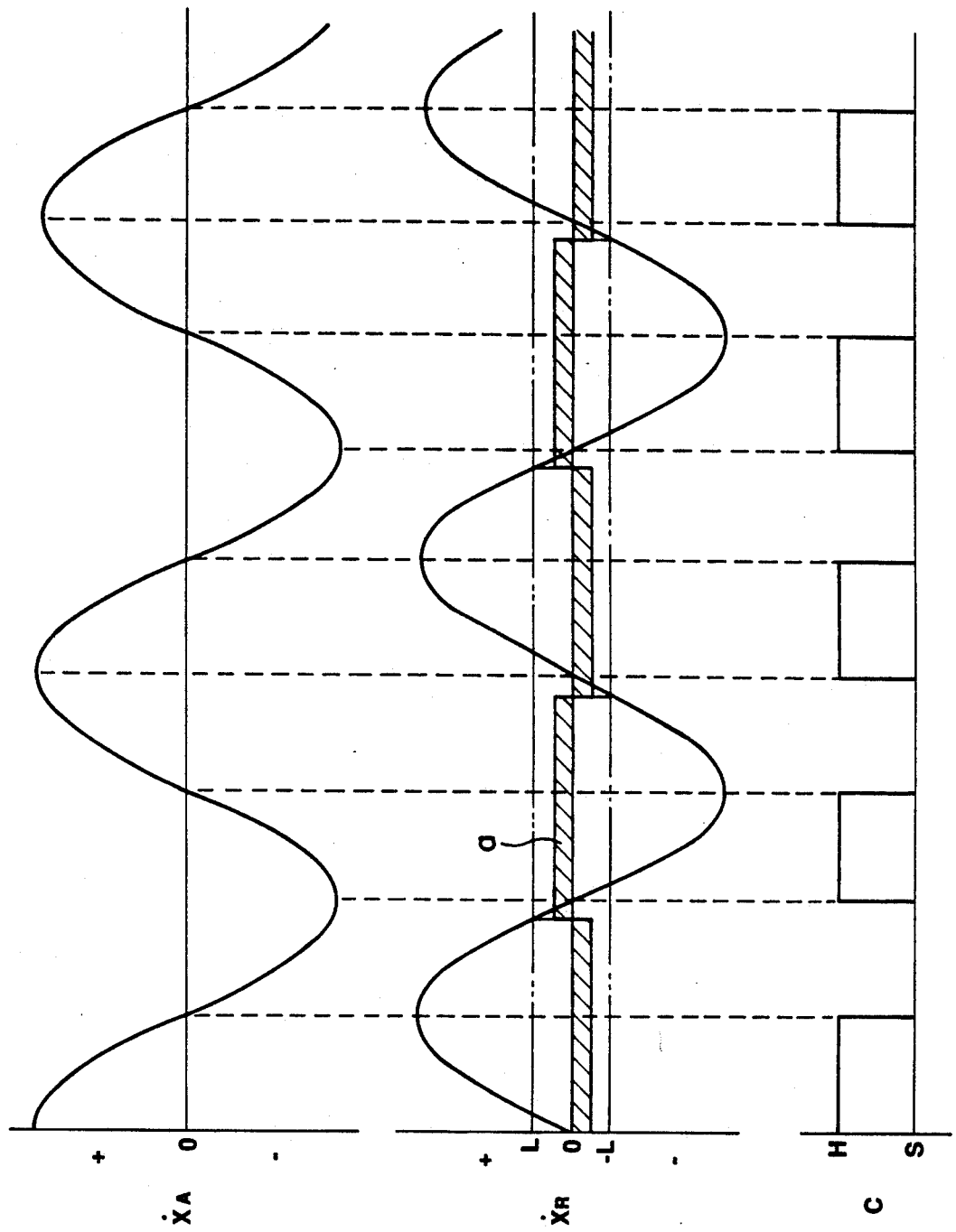

SYSTEM AND METHOD FOR CONTROLLING DAMPING FORCE CHARACTERISTIC OF SHOCK ABSORBER APPLICABLE TO AUTOMOTIVE SUSPENSION

BACKGROUND OF THE INVENTION (1) Field of the Invention

The present invention relates to a system and method for controlling a damping force characteristic of a shock absorber (hereinafter referred to as a damper) installed between an unsprung mass and a sprung mass of an automotive vehicle and particularly relates to the controlling system and method with a countermeasure against noise signals.

(2) Description of the Background Art

Japanese Patent Application First (unexamined) Publication No. Showa 61-163011 exemplifies a previously proposed damping force controlling system with the countermeasure against noise signals.

The disclosed damping force controlling system determines whether a direction of a velocity of the sprung mass coincides with a direction of a relative velocity between the unsprung mass and the sprung mass. The direction of the velocity of the sprung mass is detected by means of a detector for detecting the direction of the velocity of the sprung mass (vehicle body) and the direction of the relative velocity is detected by means of another detector for detecting the direction of the relative velocity.

The disclosed damping force controlling system carries out a basic control such that a control signal is output so as to reduce a damping factor of the damper when it is determined that the velocity and relative velocity do not coincide with each other and the control signal is output so as to increase the damping factor of the damper when it is determined that the velocity and the relative velocity coincide with each other.

Furthermore, the disclosed damping force controlling system determines whether an absolute value of the difference between a relative displacement between the sprung mass and unsprung mass and a neutral point of the relative displacement (a moving average in a long term of the relative displacement) exceeds a predetermined dead zone and switches the damping factor of the damper toward the higher damping side in the basic control described above only when determining that the neutral point exceeds the dead zone.

However, since, in the disclosed damping force controlling system, the dead zone is provided in a region in the vicinity to the neutral point, the control described above is possible with noise signals eliminated. Conversely, since the control is not performed until the detected signal value of the neutral point exceeds the dead zone, a delay of control correspondingly occurs. Thus, a timing at which the damping factor is switched becomes later than the timing at which the damper is in the neutral state.

Consequently, the steering stability of the vehicle deteriorates.

SUMMARY OF THE INVENTION

It is an object of the present invention to provide a damping force controlling system and method in which a dead zone is provided to prevent a generation of delay in a switch timing of a damping factor with countermeasure of noise signal disturbances taken, thereby improving steering stability.

The above-described object can be achieved by providing a damping force controlling system for a vehicular damper, comprising: a) damping force adjusting means for adjusting a damping force characteristic of the damper at a plurality of stages in response to a control signal; b) sprung mass velocity detecting means for detecting a velocity of an unsprung mass of the vehicle; c) relative velocity detecting means for detecting a relative velocity between a sprung mass and an unsprung mass of the vehicle; and d) controlling means for providing a predetermined dead zone for the relative velocity between the sprung mass and unsprung mass, determining whether a direction of the velocity of the sprung mass coincides with a direction of the relative velocity, outputting the control signal to control a damping force of the damper toward a higher damping force side when the direction of the velocity of the sprung mass coincides with the direction of the relative velocity and when determining that the relative velocity exceeds the predetermined dead zone, outputting the control signal to control the damping force of the damper toward a lower damping force side when determining that the direction of the velocity of the sprung mass does not coincide with the direction of the relative velocity, determining the stroke direction of the damper on the basis of the relative velocity, and shifting, the predetermined dead zone by a predetermined quantity in a direction which is the reverse of the determined stroke direction.

The above-described object can also be achieved by providing a method for controlling a damping force of a vehicular damper, said damper having damping force adjusting means for adjusting a damping force characteristic of the damper at a plurality of stages in response to a control signal, comprising the steps of: a) detecting a velocity of an sprung mass of the vehicle and outputting a first signal indicative thereof; b) detecting a relative velocity between the sprung mass and unsprung mass of the vehicle and outputting a second signal indicative thereof; and c) providing a predetermined dead zone for the relative velocity between the sprung mass and unsprung mass, determining a stroke direction of the damper on the basis of the relative velocity, shifting the predetermined dead zone by a predetermined quantity in a direction which is the opposite of the determined stroke direction; and d) determining whether direction of the velocity of the sprung mass coincides with the direction of the relative velocity, outputting the control signal to control a damping force of the damper toward a higher damping force side when the direction of the velocity of the sprung mass coincides with the direction of the relative velocity and when determining that the relative velocity exceeds the predetermined dead zone, and outputting the control signal to control the damping force of the damper toward a lower damping force side when determining that the direction of the velocity of the sprung mass does not coincide with the direction of the relative velocity.

BRIEF DESCRIPTION OF THE DRAWINGS

FIGS. 5 (A) through 5 (C) are timing charts of variations of sprung mass velocity, relative velocity, and damping factor during vehicle operation.

DETAILED DESCRIPTION OF THE PREFERRED EMBODIMENT

Reference will hereinafter be made to the drawings in order to facilitate a better understanding of the present invention.

Figure 1:
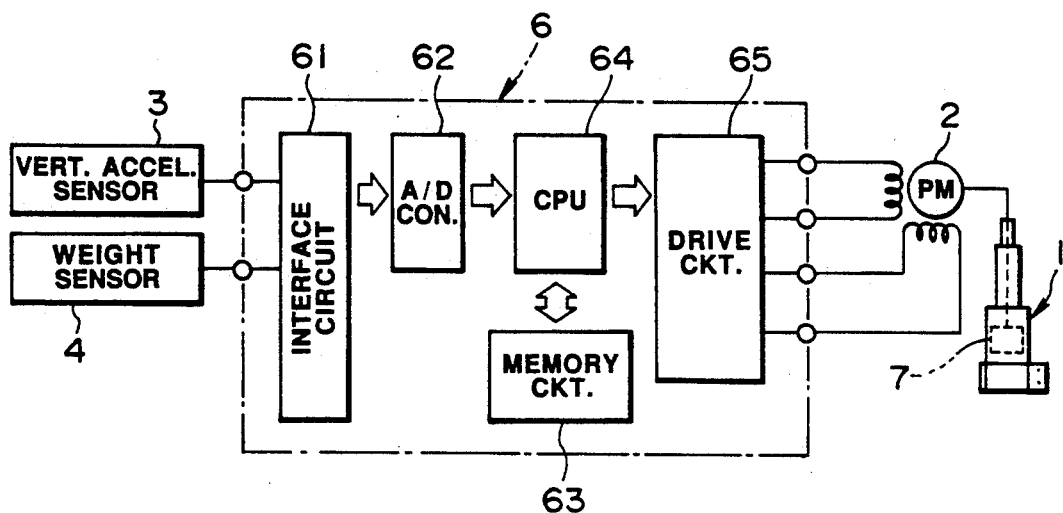
FIG. 1 is a circuit block diagram of a damping force controlling system utilized in a preferred embodiment according to the present invention.

FIG. 1 shows a damping force controlling system in a preferred embodiment according to the present invention.

It is noted that a damper denoted by 1 is a damping force variable type damper and its damping force characteristic can be varied between eight damping stages. The structure of the damper is exemplified by U.S. Pat. No. 4,961,483, (the disclosure of which is hereby incorporated by reference).

It is also noted that the damper 1 shown in FIG. 1 can alternatively be exemplified by a Japanese Patent Application First Publication No. Heisei 3-84237 in which the damping force can be varied continuously, (the disclosure of which is herein incorporated by reference).

The damper 1 includes a piston rod and damping force adjusting means (mechanism) 7 having a hydraulic flow adjuster installed in the piston rod. The damping force adjusting means 7 is rotated so that a damping force range in the expansion and compression strokes can be varied in eight stages between a soft position and a hard position.

A pulse motor 2 drives the damping force adjusting means 7 of the damper 1 to vary the position of the damping force adjusting means 7 in eight stages, thus the damping force adjusting means 7 changes the damping force to one of the eight stages.

A vertical acceleration sensor 3 detects an acceleration in a vertical direction of a sprung mass, i.e., a vehicle body and outputs an electric signal according to a magnitude of the vertical acceleration.

A weight sensor 4 is installed as relative velocity detecting means which detects a relative velocity between the unsprung mass and sprung mass and is installed on a vehicular mount portion of the damper 1, for example, for detecting an input weight applied from the damper 1 to the vehicle body and outputting an electrical signal according to the detected weight. The structure of the weight sensor is exemplified by a U.S. patent application Ser. No. 07/661,007 filed on Feb. 26, 1991, (the disclosure of which is hereby incorporated by reference).

A controller (control unit) 6 outputs a drive signal to the pulse motor 2 on the basis of the input signal derived from the vertical acceleration sensor 3 and the weight sensor 4 so that the damper 1 exhibits an optimum damping force characteristic.

That is to say, the controller 6 includes an interface circuit 61 which inputs a signal derived from the vertical acceleration sensor 3 and weight sensor 4, an A/D converter 62 which converts an input analog signal into a corresponding digital signal, and CPU 64 which executes controls of searching, retrieving, determination, and arithmetic operations on the basis of the input signals and data maps DM (refer to FIG. 2) stored in a memory circuit 63. A drive circuit 65 which outputs the drive signal on the basis of a result of control executed by the CPU 64.

Next, the data maps DM stored in the memory circuit 63 will be explained.

Figure 2:
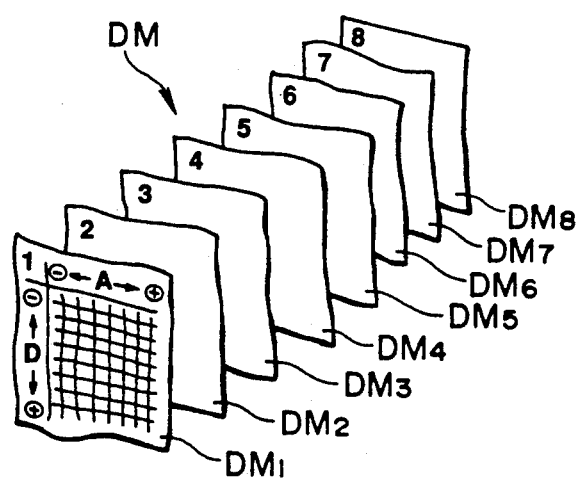
FIG. 2 is a conceptional view of a data map of the damping force controlling system shown in FIG. 1.

The data maps DM are constituted by eight data maps $DM_1 \sim DM_8$ in order to perform an eight-stage switch control for the damping force range of the damping force adjusting means 7, as shown in FIG. 2.

The data maps DM provide a stage number of the damping force adjusting means 7 on an upper left corner which is an intersection between an upper column and a left column, the upper column indicating values of vertical acceleration data derived from the vertical acceleration data input from the vertical acceleration sense 3, the left column indicating a weight data detected by the weight sensor 4, each internal of both intersection lines indicating an optimum damping force range (,i.e., a switch position of the pulse motor 2) of the eight-stage damping force range according to the vertical acceleration data and weight data.

The internals of the intersection lines in an area in which the directions of the sprung mass velocity and of the relative velocity between the sprung mass and unsprung mass coincide with each other indicate a high damping force range and the internals of the intersection lines in which they do not coincide with each other are in a low damping force range.

The vertical acceleration sensor 3 is referred to as a vertical accelerometer while the weight sensor 4 is referred to as a load sensor.

The structure of the controller 6 including such sensors as described above, is exemplified by U.S. patent application Ser. No. 07/682,593 fled on Apr. 8, 1991, (the disclosure of which is hereby incorporated by reference).

Next, the contents of control executed by the controller 6 will be described with reference to FIGS. 3 and 4.

Figure 3:
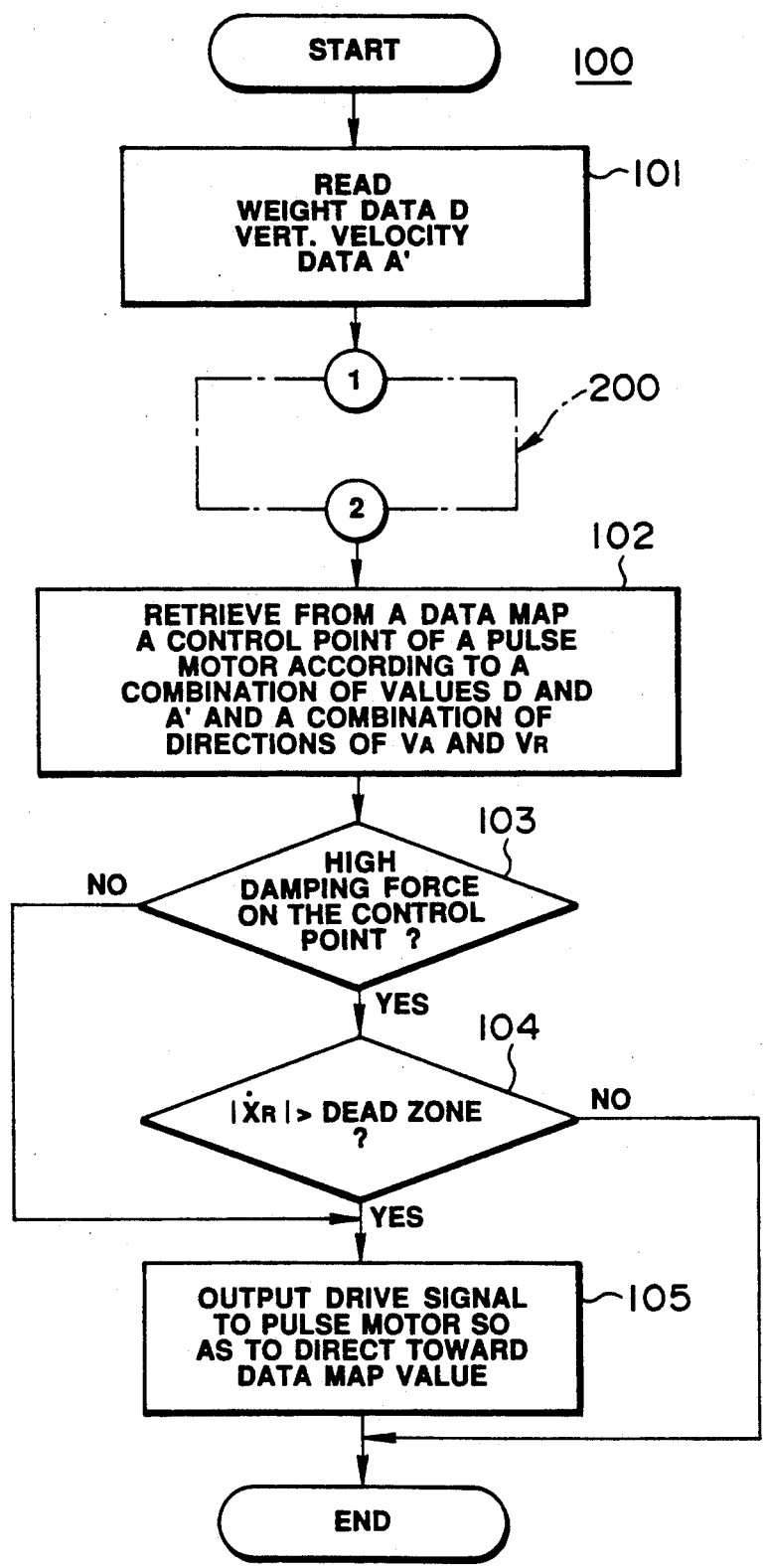
FIGS. 3 and 4 are an integrally operational flowchart executed by a control unit shown in FIG. 1.

FIG. 3 shows a main routine 100 executed by the controller 6.

In step 101, the CPU 64 reads values of the weight data D and vertical velocity data A' thereinto.

Then, the routine goes to step 200.

Figure 4:
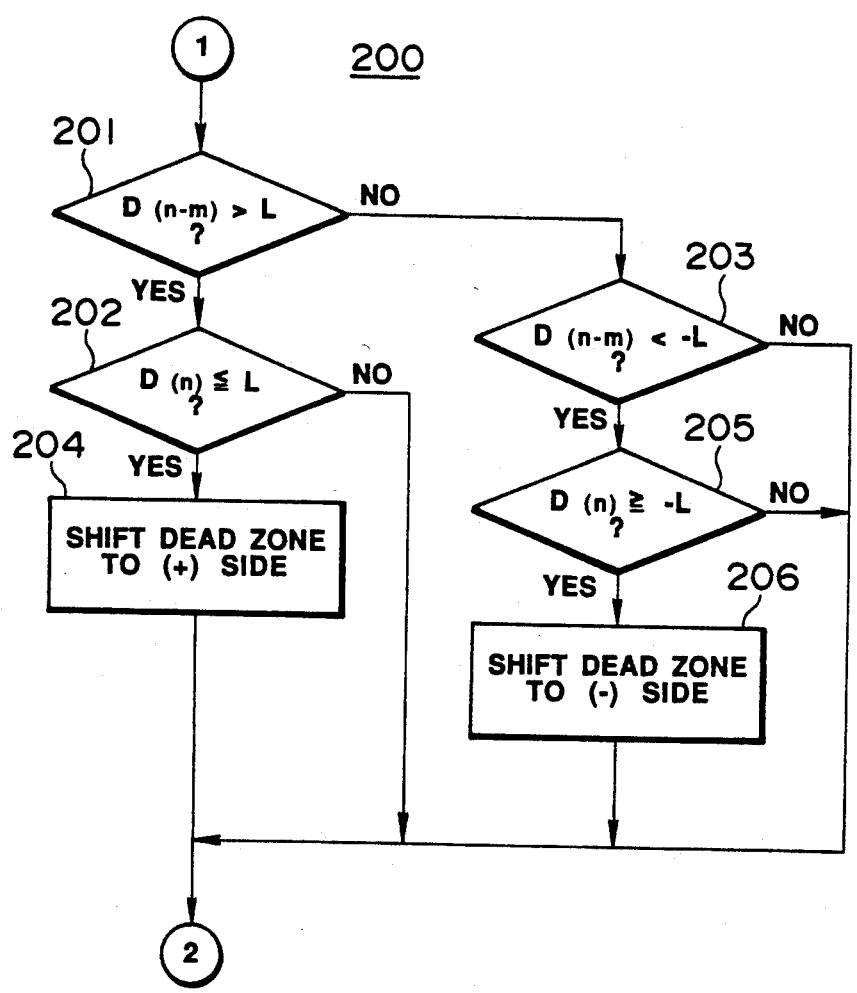

FIG. 4 shows a subroutine executed in the step 200.

In the subroutine of step 200, the first step viz., step 201, is such that the CPU 64 determines whether the value of the weight signal D(n−M) which occurred m number of times before the latest data, is greater than a predetermined boundary limit L at a plus side. If YES in the step 201, the routine goes to a step 202. If NO, the routine goes to a step 203.

The CPU 64, in the step 202, determines whether the value of the latest weight signal D(n) is equal to or less than the predetermined boundary limit L. If YES in the step 202, the routine goes to a step 204. If NO, the routine goes to step 102 of the main routine 100 ending the subroutine 200.

In step 204, a dead zone a is shifted toward the plus side (+). That is to say, the steps 201 and 202 can serve to determine whether the damper 1 is undergoing an expansion stroke and, therefore, the dead zone a is shifted toward the compression side.

In the step 203, the CPU 64 determines whether the weight signal value D (n−m) which occurred m number of times before the latest data, is smaller than a predetermined boundary limit −L at a minus side (−). If YES in the step 203, the routine goes to a step 205. If NO, the subroutine 200 is ended and the routine goes to step 102 of the main routine 100.

In step 205, the CPU 64 determines whether the weight signal value D(n) of the latest data is equal to or greater than the predetermined boundary limit $-L$ at the minus side. If YES in step 205, the routine goes to step 204. If NO, the subroutine 200 is ended and goes to step 102 of the main routine 100.

In step 204, the CPU 64 shifts the dead zone a toward the minus side $(-)$. That is to say, steps 203 and 205 can determine that the damper 1 is in the compression stroke. Accordingly, the dead zone a is shifted toward the expansion stroke.

The subroutine 200 corresponds to a regional control of a dead zone in which $+L$ and $-L$ serve as boundary values, a first point of time at which the value of the relative velocity $\dot{X}_R$ goes from a value over $+L$ to a value lower than $+L$ and a second point of time at which the value of the relative velocity $\dot{X}_R$ goes from a value lower than $-L$ to a value higher than $-L$ are trapped to detect a stroke direction so that the dead zone is correspondingly shifted in a direction opposite to the stroke direction. In the preferred embodiment, the shift quantity is $\frac{1}{2}$ a width of the dead zone a.

Next, in step 102, the CPU 64 retrieves from the data maps DM a control point, i.e., an optimum damping factor of the pulse motor 2 according to values of the weight data D and vertical velocity data A' (see FIG. 3.).

In step 103, the CPU 64 determines whether the control point is in the high damping range.

If YES in step 103, the routine goes to step 104. If NO in step 103, the routine goes to step 105.

In step 104, the CPU 64 determines whether the relative velocity $|\dot{X}_R|$ is greater than values of the dead zone a. If YES in step 105, a command signal corresponding to the control point is output to the pulse motor 2. That is to say, in this case, one of the data maps DM present in the most front row which coincides with the switch stage of the damping force adjusting means 7 is referred to. Next, in the corresponding data map DM, the control point (=optimum damping factor) corresponding to both data D and A' is retrieved.

On the other hand, in response to NO in step 104, the main routine is ended and the control point previously set (low damping force) is maintained.

One operational flow is ended as described above and the controller 6 repeats the above operation flow.

FIGS. 5 (A) through 5 (C) show timing charts indicating the result obtained using the routines which are depicted in the flowcharts shown in FIGS. 3 and 4.

A symbol $\dot{X}_A$ shown in FIG. 5 (A) denotes the velocity of the sprung mass derived from data A'.

As shown in FIGS. 5 (A) through 5 (B), when the stroke direction determined on the basis of the relative velocity $\dot{X}_R$, the dead zone is shifted toward the direction opposite to the stroke direction of the damper 1 so that the boundary at the stroke direction indicates zero under the shift state. Hence, since the time at which the damping factor is changed from the hard position to the soft position becomes earlier it coincides with the time at which the damper 1 becomes neutral. Therefore, the time at which the damping factor is switched can be controlled to an optimum.

The damping force controlling system in the preferred embodiment prevents a delay of the timing with which the damping factor is switched through the dead zone, thereby securing steering stability.

Since in the preferred embodiment an optimum damping force is set via retrieval from the data maps DM stored in the memory circuit 63 without arithmetic operations based on the input signals, the structure of the controller 6 can simplified and thus reduce the manufacturing cost. In addition, control response characteristic can be improved since the operation of the controller is dedicated to the retrieval of the data from the data maps.

In the preferred embodiment, the predetermined boundary limits $\pm L$ are fixed. However, the predetermined boundary limits can be made variable according to vehicle speed, steering angle, and operations of the accelerator and brake pedals.

The damper 1 in the preferred embodiment is variable in eight stages but may be variable in any desired number of stages.

In the preferred embodiment, the control method is such that the controller 6 retrieves the data from the data maps stored in the memory circuit 63.

However, the control method may be such a control method disclosed in a Japanese Patent Application First Publication Heisei 63-6238.

As described hereinabove, since the dead zone range control portion is provided in the damping force controlling system and method according to the present invention and shifts the dead zone range in the direction opposite to the stroke direction of the damper by the predetermined quantity, the timing with which the relative velocity between the sprung mass and unsprung mass exceeds the dead zone becomes faster than the case in which the dead zone range is not shifted and the timing at which the damping factor is switched from the low damping side to the high damping side likewise becomes faster. Therefore, the delay in the timing with which the damping factor is switched due to noise is prevented so that the vehicular steering stability can be improved.

It will be appreciated by those skilled in the art that the foregoing description has been made to the preferred embodiment and various changes and modifications may be made without departing from the scope of the present invention which is defined by the appended claims.

What is claimed is:

1. A damping force controlling system for a vehicular damper for a vehicle, comprising:
    a) a damping force adjusting means for adjusting a damping force of the damper at a plurality of stages in response to a control signal;
    b) sprung mass velocity deriving means for deriving a vertical velocity of a sprung mass of the vehicle, on the basis of a vertical acceleration signal derived by a vertical acceleration sensor;
    c) relative velocity detecting means for detecting a relative velocity between the sprung mass and unsprung mass of the vehicle;
    d) controlling means for providing the control signal to said damping force adjusting means so that the damping force is changed to a relatively high damping force when both directions of the vertical velocity of the vehicle derived by the sprung mass velocity deriving means and said relative velocity coincide with each other and when said relative velocity exceeds a predetermined dead zone, said predetermined dead zone being shifted by a predetermined quantity toward one of the stroke directions of the damper opposite to the other stroke direction in which the damping force change is carried out in response to said relative velocity and, on the other hand, for providing the control signal to said damping force adjusting means so that the damping force is changed to a relatively low damping force side when both directions of the vertical velocity of the vehicle derived by the sprung mass velocity deriving means and said relative velocity do not coincide with each other and when said relative velocity exceeds the predetermined dead zone, said predetermined dead zone being shifted by the predetermined quantity toward one of the stroke directions opposite to the stroke direction in which the damping force change is carried out in response to said relative velocity.

2. A damping force controlling system for a vehicular damper as set forth in claim 1, wherein the predetermined quantity of shift is half of a width of the predetermined dead zone.

3. A damping force controlling system for a vehicular damper as set forth in claim 2, wherein said sprung mass velocity deriving means outputs a first signal according to said vertical acceleration of the sprung mass and said relative velocity detecting means comprises a weight sensor installed on a vehicular body mounting position of the damper for outputting a second signal according to a weight pulled from the damper to the vehicular body, both first and second signals being supplied to said controlling means.

4. A damping force controlling system for a vehicular damper as set forth in claim 3, wherein said controlling means reads in data on said first and second signals derived from said vertical acceleration sensor and said weight sensor and determines the stroke direction of the damper depending on whether the read data $D(n-m)$ on the second signal derived from the weight sensor m number of times before the latest data $D(n)$ is below either a limit value $(L.-L)$ of the predetermined dead zone or the read latest data $D(n)$ of the first signal derived from said vertical acceleration sensor equals to or is smaller than either said limit value of the predetermined dead zone.

5. A damping force controlling system for a vehicular damper as set forth in claim 4, wherein said controlling means determines that the damper is in an expansion stroke direction when the read data $D(n-m)$ is below a plus limit value $(L)$ and the read latest data $D(n)$ equals to or smaller than the plus limit value $(L)$ and wherein said controlling means shifts the predetermined dead zone toward a compression stroke direction by the predetermined quantity.

6. A damping force controlling system for a vehicular damper as set forth in claim 5, wherein said controlling means determines that the damper is in a compression stroke direction when the read data $D(n-m)$ is below a minus limit value $(-L)$ and the read latest data $D(n)$ equals to or smaller than the minus limit value $(-L)$ and wherein said controlling means shifts the predetermined dead zone toward an expansion stroke direction by the predetermined quantity.

7. A damping force controlling system for a vehicular damper as set forth in claim 6, wherein both of said plus and minus limit values are fixed.

8. A damping force controlling system for a vehicular damper as set forth in claim 7, wherein both of said plus and minus limit values are variable.

9. A damping force controlling system for a vehicular damper as set forth in claim 4, wherein said controlling means includes a pulse motor for driving the damping force characteristic adjusting means of the damper and a data map memory storing an optimum damping factor indicated by a control point of the pulse motor according to the data associated with the first and second signals.

10. A damping force controlling system for a vehicular damper as set forth in claim 9, wherein said damper has eight stages of damping force adjusting range and wherein said memory stores eight data maps related to the control points of the pulse motor according to the associated stage of the damping force adjusting range.

11. A damping force controlling system for a vehicular damper as set forth in claim 10, wherein said controlling means further determines whether the control points from one of the data maps indicates a predetermined high damping force and secondly determines whether an absolute value of the relative velocity $|X_R|$ falls within the predetermined dead zone.

12. A method for controlling a damping force of a vehicular damper, said damper having damping force adjusting means for adjusting a damping force characteristic of the damper at a plurality of stages in response to a control signal, comprising the steps of:
   a) deriving a vertical velocity of a vehicle body of the vehicle on the basis of an output signal of a vertical acceleration sensor and outputting a first signal indicative thereof;
   b) detecting a relative velocity between the sprung mass and the unsprung mass of the vehicle and outputting a second signal indicative thereof;
   c) providing a predetermined dead zone for the relative velocity between the sprung mass and the unsprung mass, determining a stroke direction of the damper on the basis of the relative velocity, shifting the predetermined dead zone by a predetermined quantity toward a direction opposite to the determined stroke direction; and
   d) determining whether a direction of the vertical velocity of the vehicular body coincides with a direction of the relative velocity, outputting the control signal to control a damping force of the damper toward a high damping force side when the direction of the vertical velocity of the vehicle body coincides with the direction of the relative velocity and when determining that the relative velocity exceeds the predetermined dead zone, and outputting the control signal to control the damping force of the damper toward a lower damping force side when determining that the direction of the vertical velocity of the vehicular body does not coincide with the direction of the relative velocity.

13. A damping force controlling system for a vehicular suspension damper, comprising:
   a) a damping force adjusting means for adjustably controlling a damping force of the damper at any one of a plurality of stages in response to a control signal;
   b) a vertical acceleration sensor for detecting a vertical acceleration of a vehicle body and outputting a first signal indicative thereof;
   c) first velocity detecting means for detecting a vertical velocity of the vehicle body on the basis of the first signal derived from the vertical acceleration sensor and outputting a second signal indicative thereof;
   d) second velocity detecting means for detecting a relative velocity between a sprung mass of the vehicle body and an unsprung mass of the vehicle and outputting a third signal indicative thereof;
   e) control means for providing the control signal to said damping force adjusting means so that the damping force is increased within a direction of the vertical velocity indicated by the second signal and a direction of the relative velocity indicated by the third signal coincide and simultaneously when a magnitude of the third signal exceeds a first limit of a predetermined dead zone, said predetermined dead zone is shifted by a predetermined quantity in a stroke direction which is opposite to the stroke direction in which said damping force change is being carried out in response to the third signal, and for providing the control signal to said damping force adjusting means so that the damping force is reduced when the direction indicated by the second signal and the direction indicated by the third signal are non-coincident, and simultaneously when the magnitude of the third signal exceeds a second limit of the predetermined dead zone, said predetermined dead zone is shifted by the predetermined quantity in a stroke direction which is opposite to the stroke direction in which the damping force change is being carried out in response to the third signal.

14. A damping force controlling system for a vehicular suspension damper, comprising:

a) damping force adjusting means, responsive to a control signal, for adjustably controlling a damping force of the damper;

b) a vertical acceleration sensor for detecting a vertical acceleration of a vehicle body and outputting a first signal indicative thereof;

c) first velocity determining means for determining a vertical velocity of the vehicle body using said first signal and outputting a second signal indicative of the vertical velocity;

d) relative velocity determining means for determining a relative velocity between a sprung mass of the vehicle body and an unsprung mass of the vehicle and outputting a third signal indicative thereof; and e) control means for:

comparing the relative velocity indicated by said third signal with a predetermined dead zone and shifting said predetermined dead zone by a predetermined amount in a stroke direction which is opposite to the stroke direction indicated by said third signal when the magnitude of the third signal exceeds a limit of said predetermined dead zone for producing said control signal;

providing the control signal to said damping force adjusting means so that the damping force is increased when a direction of the vertical velocity indicated by said second signal is the same as a direction of the relative velocity indicated by said third signal, and providing the control signal to said damping force adjusting means so that the damping force is reduced when the direction of the vertical velocity indicated by said second signal is different from the direction of the relative velocity indicated by said third signal.

* * * * *